United States Patent Office 3,014,924
Patented Dec. 26, 1961

3,014,924
CATALYTIC PROCESS FOR MAKING UNSATURATED CYCLIC ACETALS
Armand Edward Brachman, Wilmington, Del., assignor to E. I. du Pont de Nemours and Company, Wilmington, Del., a corporation of Delaware
No Drawing. Filed Apr. 15, 1958, Ser. No. 728,546
4 Claims. (Cl. 260—338)

This invention relates to a process and more particularly to a catalytic process for making unsaturated cyclic acetals directly from alpha,beta-unsaturated aldehydes and aliphatic polyols.

Known processes for making acetals, and particularly cyclic acetals, by direct synthesis have had several serious disadvantages. Conventional processes for the direct condensation of alpha,beta-unsaturated aldehydes and polyols in the presence of acid catalysts yield large portions of impurities, principally beta-alkoxyacetals and beta-alkoxyaldehydes which are formed by the addition of the polyols across the alpha,beta-double bond of the aldehydes. As a consequence of these undesirable side reactions, attempts have been made to prevent the formation of the aforementioned impurities by reducing the temperature and catalyst concentration; however, these modifications lead to impractically low rates of reaction. Known solid catalysts have also proved deficient in that they lead to long reaction times, large quantities of impurities and residues including polymers and condensation products. In addition, known solid catalysts lose their activity rapidly. Furthermore, in conventional direct syntheses using polyols, the polyols dehydrate and react to give large quantities of residues and impurities.

I have discovered a catalytic process for making unsaturated cyclic acetals by direct synthesis which is rapid, efficient and requires only small portions of catalysts.

The process of this invention comprises reacting an alpha,beta-unsaturated aldehyde with an aliphatic polyol bearing at least two hydroxyl groups bonded to different atoms in the polyol molecule in the presence of a catalyst comprising a highly-porous solid carrier having a surface area of at least 75 square meters per gram and about from 0.025 to 1.0 millimole per unit weight of carrier of a strong mineral acid.

One convenient method for preparing the catalysts is to first form a slurry in water or other suitable vehicle of the carrier. Next, an amount of mineral acid sufficient to give the desired weight of acid per unit weight of carrier is added to the slurry. Finally, the water is evaporated, then the catalyst is dried at elevated temperature, for example, at 100 to 150° C. for several hours.

The mineral acids used are, for example, phosphoric acid, hydrobromic acid, hydrochloric acid and sulfuric acid. Orthophosphoric acid is particularly preferred because, in combination with the carrier, it gives a high yield at high rates with a minimum of residue.

Highly-porous silica-alumina gel-type structures such as those prepared essentially by precipitating and calcining an alumina hydrogel with or on a precipitated silica hydrogel are preferred. Other suitable carriers include, for example, silica gel, kieselguhr, diatomaceous earth and porous structures of alumina, silica and various combinations thereof with oxides of zirconium, thorium, chromium and the like. The preferred carriers have some catalytic activity in themselves and, although they are not suitable per se, in combination with the aforementioned mineral acids they give particularly high rates, high yields and a minimum of side reactions.

The surface area of the catalyst is critical. Catalysts formed with carriers having a surface area below 75 square meters per gram do not cause sufficiently rapid rates of reaction. Surface areas of 150 to 350 square meters per gram are preferred. Although considerable improvement is obtained with carriers having a surface area of greater than 350 square meters per gram, carriers having a surface area considerably above this value, for example, substantially above 550 square meters per gram, cause an increase in side reactions and a decrease in yield. Correspondingly, the amount of mineral acid is critical. If less than about 0.025 millimole of acid per unit weight of catalyst is used, the reaction rate is impractically slow. If more than about 1.0 millimole of acid per unit weight of carrier are used, the proportion of by-product residue is increased. Preferably 0.1 to 0.3 millimole of acid per unit weight of carrier are used. As used herein, the expression "millimoles of acid per unit weight of carrier" means milligrammoles per gram, millipoundmoles per pound, millitonmoles per ton and the like, that is, $1/1000$ mole of acid per unit weight of carrier, both the amount of acid and the amount of carrier being expressed in the same system of units. The form in which the catalyst is used, for example, pelleted masses, pulverant form, extruded shapes, small spheroids, etc., is not critical. Particles of less than about 20 mesh are usually used.

The process of this invention is useful with any of a wide variety of alpha,beta-unsaturated aldehydes; however, improvement is most marked with acrolein and alpha-substituted acroleins such as methacrolein, ethacrolein, alpha-phenylacrolein, alpha-cyanoacrolein, alpha-chloroacrolein, alpha-fluoroacrolein and the like. Of these, acrolein is the most difficult to react with high yields and, correspondingly, the process of this invention is most adapted to reactions therewith.

Aliphatic polyols having at least two hydroxyl groups bonded to different atoms in the polyol molecule can be used in the process of this invention. Such polyols include, for example, ethylene glycol, 1,3-propane diol, 1,2,6-hexane triol, 1,3-6-hexane triol, glycerol, sorbitol, pentaerythritol, diglycerol, 1,1,1-trimethylol propane and 1,4,7-heptane triol and mixtures thereof. Since the possibility of dehydration of the polyol and other side reactions increases with number of hydroxyl groups per molecule, the improvement obtained by the process of this invention is most marked with polyols having three or more hydroxyl groups per molecule. In addition, polyols bearing at least two hydroxyl groups separated by 2 to 4 carbon atoms cyclize most readily by the process of this invention. Hence, alkyl polyols such as 1,2,6-hexane triol, 1,4,7-heptane triol, 1,3,5-pentane triol and glycerol are particularly preferred.

Preferably, polyol and catalyst are added to a suitable reaction vessel together with a water-immiscible solvent which forms an azeotrope with water and the aldehyde. Next, the alpha,beta-unsaturated aldehyde is added slowly to the reaction mixture. During the reaction, water unreacted aldehyde and azeotroping agent are continuously distilled, the water is separated, then the agent and aldehyde are returned to the reaction vessel. Preferably the azeotroping agent is at least partially miscible with both reactants. Such preferred agents are, for example, xylene, toluene, benzene, cyclohexane, chloroform, diisobutylene, and hexane.

Reaction temperature of 50 to 150° C. and preferably 100 to 125° C. are usually used. The temperature can be controlled by selecting an azeotroping agent which forms an azeotrope boiling within the aforementioned range with water and the particular aldehyde used.

The ratios of reactants are not critical. Molar ratios of aldehyde to polyol of less than 2:1 are usually used. It is preferable to use an excess of polyol. The amount of catalyst is not critical; however, amounts of from 0.1 to 3% based on the total weight of reactants are preferred.

An alternative method of carrying out the reaction is to use the aldehyde to remove water; however, this reaction, which does not employ an inert solvent azeotroping agent, favors side reactions somewhat more than the preferred process. An alternative continuous method for carrying out the reaction is to continuously add polyol together with dispersed catalyst to a reaction vessel along with a second continuous stream containing a mixture of azeotroping agent and aldehyde. While azeotrope is continuously removed, separated and the aldehyde and agent are refluxed, the reaction mixture is continuously withdrawn from the vessel, fractionated and recycled.

The reactants can also be passed through a porous bed of catalyst, then fractionated and recycled.

The products of this invention can be separated by fractional distillation under reduced pressure, washed and treated by conventional purification procedures known in the art.

The products of this invention are unsaturated cyclic acetals, such as 2-vinyl-1,3-dioxolanes, dioxanes and dioxepanes. Such compounds include, for example, 4(hydroxymethyl)-2-vinyl-1,3-dioxolane, 4(4'-hydroxybutyl)-2-vinyl-1,3-dioxolane, 2-vinyl-5-hydroxy-1,3-dioxane, 4(4'-hydroxybutyl)-2-isopropenyl-1,3-dioxolane, 2-isopropenyl-5-methyl-5-methylol-1,3-dioxane, 4(4'-hydroxybutyl)-2-vinyl-1,3-dioxane and 4(4'-hydroxybutyl)-2-vinyl-1,3-dioxepane. These products are very potent solvents and are useful, for example, for forming solutions of difficultly soluble polymers such as, for example, polyureas and polyurethans. They are also useful as solvents because of their mutual miscibility with both water and a large number of organic materials. The products can also be esterified to yield compounds useful as film-forming materials in coating compositions.

The following examples are intended to illustrate the invention and not to limit it in any way. Parts are by weight unless otherwise specified.

*Example 1*

A catalyst was prepared by first forming a slurry of ground "Mobilbead W" in water and adding thereto sufficient orthophosphoric acid to bring the concentration of acid to approximately 0.2 millimole of acid per unit weight of solid "Mobilbead W." The "Mobilbead W" (a proprietary product of the Socony Mobil Oil Company, Inc.) contained about 87.5% by weight of $SiO_2$, 12.4% of $Al_2O_3$, 0.1% of chromium, and a trace of iron and had a particle size of smaller than about 250 mesh and a surface area of about 260 square meters per gram. The slurry was heated until substantially all of the water had evaporated therefrom, then the moist catalyst was dried in an oven overnight at about 120° C.

About 268 parts of 1,2,6-hexane triol, 150 parts of toluene, and 1.9 parts of the aforementioned catalyst were charged to a reaction vessel equipped with a reflux condenser and water separator. About 125 parts of acrolein were added slowly to the reaction mixture while water, toluene and acrolein were continuously azeotropically distilled at about 110° C. The water was separated and the acrolein and toluene were returned to the reaction vessel. The reaction was continued for 4 hours. Finally, the low-boiling materials were distilled from the reaction mixture, then the product, 4(4'-hydroxybutyl)-2-vinyl-1,3-dioxolane, was distilled at about 100 to 130° C. at a pressure of about 1.0 millimeter of mercury absolute. About 295 parts of colorless liquid product consisting of 97% 4(4'-hydroxybutyl)-2-vinyl-1,3-dioxolane, representing a yield of about 83%, were obtained.

The procedure described above was repated except that 5.7 parts of carrier without mineral acid were substituted for the 1.9 parts of the catalyst used above. After the reaction had been continued for about 6½ hours, the yield of 4(4'-hydroxybutyl)-2-vinyl-1,3-dioxolane was only about 65%.

The procedure described above was repeated using 1.8 parts of orthophosphoric acid and no solid carrier instead of the catalyst described above. The reaction was continued for about 12 hours and the yield of 4(4'-hydroxybutyl)-2-vinyl-1,3-dioxolane was only about 51%. A considerable portion of high boiling residue was obtained.

*Example 2*

The procedure of Example 1 was repeated using a catalyst comprising the carrier used in that example and 0.3 millimole of hydrochloric acid per unit weight of carrier. A yield of about 80% of 4(4'-hydroxybutyl)-2-vinyl-1,3-dioxolane was obtained after about 4 hours.

The procedure of this example was repeated using a catalyst comprising the same amount of hydrochloric acid but no carrier. After 5 hours reaction, less than about 35% yield was obtained.

*Example 3*

About 268 parts of 1,2,6-hexane triol, 150 parts of toluene, and about 1.9 parts of catalyst were charged to a reaction vessel. The catalyst consisted of a "Mobilbead" alumina-silica carrier having a surface area of about 550 square meters per gram and a particle size of less than 250 mesh and 0.1 millimole of sulfuric acid per unit weight of carrier.

About 125 parts of acrolein were added slowly to the reaction mixture over a period of about 2 hours while water, toluene and unreacted acrolein were continuously azeotropically distilled at about 110° C. The water was separated and the acrolein and toluene were returned to the reaction vessel. After all of the acrolein had been added, azeotropic distillation and refluxing were continued for an additional 1½ hours. Finally, the low-boiling materials were distilled from the reaction mixture, then 4(4'-hydroxybutyl)-2-vinyl-1,3-dioxolane having an index of refraction of about 1.4640 was distilled at a temperature of about 100 to 135° C. and a pressure of 0.7 millimeter of mercury absolute. The yield of product was about 75%.

If about 160 parts of methacrolein are substituted for acrolein in the process of this example, at least as high yields of the corresponding 4(4'-hydroxybutyl)-2-isopropenyl-1,3-dioxolane are obtained in less than 4 hours.

*Example 4*

The procedure of Example 3 was repeated using a catalyst comprising a highly-porous solid carrier consisting of silica gel on which was deposited 10% by weight of alumina hydrogel and about 0.1 millimole of sulfuric acid per unit weight of carrier. The carrier was of 3 to 12 mesh size and had a surface area of between about 75 and 350 square meters per gram. About 1% by weight of the catalyst based on the reactants was used. The reaction was continued for about 6 hours and good yields of 4(4'-hydroxybutyl)-2-vinyl-1,3-dioxolane were obtained.

*Example 5*

166 parts of diglycerol,

HO—$CH_2$—CHOH—$CH_2$—O
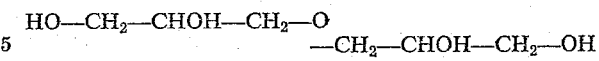—$CH_2$—CHOH—$CH_2$—OH 150 parts of toluene and about 1.9 parts of catalyst consisting of "Mobilbead" and 0.1 millimole of sulfuric acid per unit weight of "Mobilbead" carrier were charged to a reaction vessel. 125 parts of acrolein were added slowly to the reaction vessel. The reaction was continued for about 525 minutes in the manner described in previous examples. A yield of about 70% of the bis-(2-vinyl-1,3-dioxolane) of diglycerol boiling at 115 to 137° C. at 0.7 millimeter of mercury absolute were obtained.

Example 6

Twenty-five moles (2420 parts) of glycerol and 1500 parts of toluene were charged to reaction vessel along with 27.4 parts of a catalyst similar to that used in Example 3. Twenty moles (1122 parts) of acrolein were charged to the reaction vessel and the reaction was carried out at about 96 to 121° C. as described in the preceding examples. An 80% yield of a product boiling between 62 and 67° C. at a pressure of about 0.5 to 4 millimeters of mercury absolute and consisting of 80% of 4(hydroxymethyl)-2-vinyl-1,3-dioxolane and 20% by weight of 2-vinyl-5-hydroxyl-1,3-dioxane were obtained.

Example 7

4(4'-hydroxybutyl)-2-vinyl-1,3-dioxolane was prepared by a continuous process. 75 parts by volume of 1,2,6-hexane triol were charged to a reaction vessel along with 33 parts by volume of acrolein, 43 parts by volume of toluene, and 1% by weight based on the reactants of a catalyst comprising the carrier used in the catalyst of Example 1 and 0.2 millimole of sulfuric acid per unit weight of carrier. The reaction mixture was refluxed and water was continuously separated therefrom for about 75 minutes. Next, a stream of 1,2,6-hexane triol containing 1% by weight of the aforementioned catalyst was added to the reaction vessel at a rate of about 2.8 parts by volume per minute. Simultaneously, a second stream comprising 44% by volume of acrolein and 56% by volume of toluene was added to the reaction vessel at a rate of about 2.5 parts by volume per minute. At the same time, the reaction mixture was withdrawn from the vessel continuously and fractionated to yield 4(4'-hydroxybutyl)-2-vinyl-1,3-dioxolane in good yields.

I claim:

1. In the process for making unsaturated cyclic acetals which comprises reacting an alpha,beta-unsaturated aldehyde with an aliphatic polyol bearing at least two hydroxyl groups bonded to different atoms in the polyol molecule, the improvement which comprises catalyzing said reaction with the combination of a highly-porous solid carrier having a surface area of at least 75 square meters per gram and about from 0.025 to 1.0 millimole of strong mineral acid per unit weight of carrier said acid being selected from the group consisting of phosphoric acids, hydrobromic acid, hydrochloric acid and sulfuric acid.

2. The improvement of claim 1 wherein said reaction is catalyzed with the combination of a highly-porous silica-alumina carrier having a surface area of at least 75 square meters per gram and about 0.025 to 1.0 millimole per unit weight of carrier of orthophosphoric acid.

3. The improvement of claim 1 wherein said reaction is catalyzed with the combination of a highly-porous silica-alumina carrier having a surface area of at least 75 square meters per gram and about 0.025 to 1.0 millimole per unit weight of carrier of sulfuric acid.

4. The improvement of claim 1 wherein said reaction is catalyzed with the combination of a highly-porous silica-alumina carrier having a surface area of at least 75 square meters per gram and about 0.025 to 1.0 millimole per unit weight of carrier of hydrochloric acid.

References Cited in the file of this patent

UNITED STATES PATENTS

| | | |
|---|---|---|
| 1,934,309 | Hoover | Nov. 7, 1933 |
| 2,095,320 | Dreyfus | Oct. 12, 1937 |
| 2,131,998 | Billig | Oct. 4, 1938 |
| 2,297,921 | Senkus | Oct. 6, 1942 |
| 2,383,622 | Senkus | Aug. 28, 1945 |
| 2,399,068 | Senkus | Apr. 23, 1946 |
| 2,691,026 | Harvey | Oct. 5, 1954 |
| 2,729,650 | Habeshaw et al. | Jan. 3, 1956 |
| 2,802,857 | Kesslin et al. | Aug. 13, 1957 |
| 2,888,492 | Fischer et al. | May 26, 1959 |

FOREIGN PATENTS

| | | |
|---|---|---|
| 434,989 | Germany | Oct. 6, 1926 |

OTHER REFERENCES

Condensed Chemical Dictionary, edited by Francis M. Turner, Reinhold Publishing Corp., New York (1950), page 594.